Figure 1:
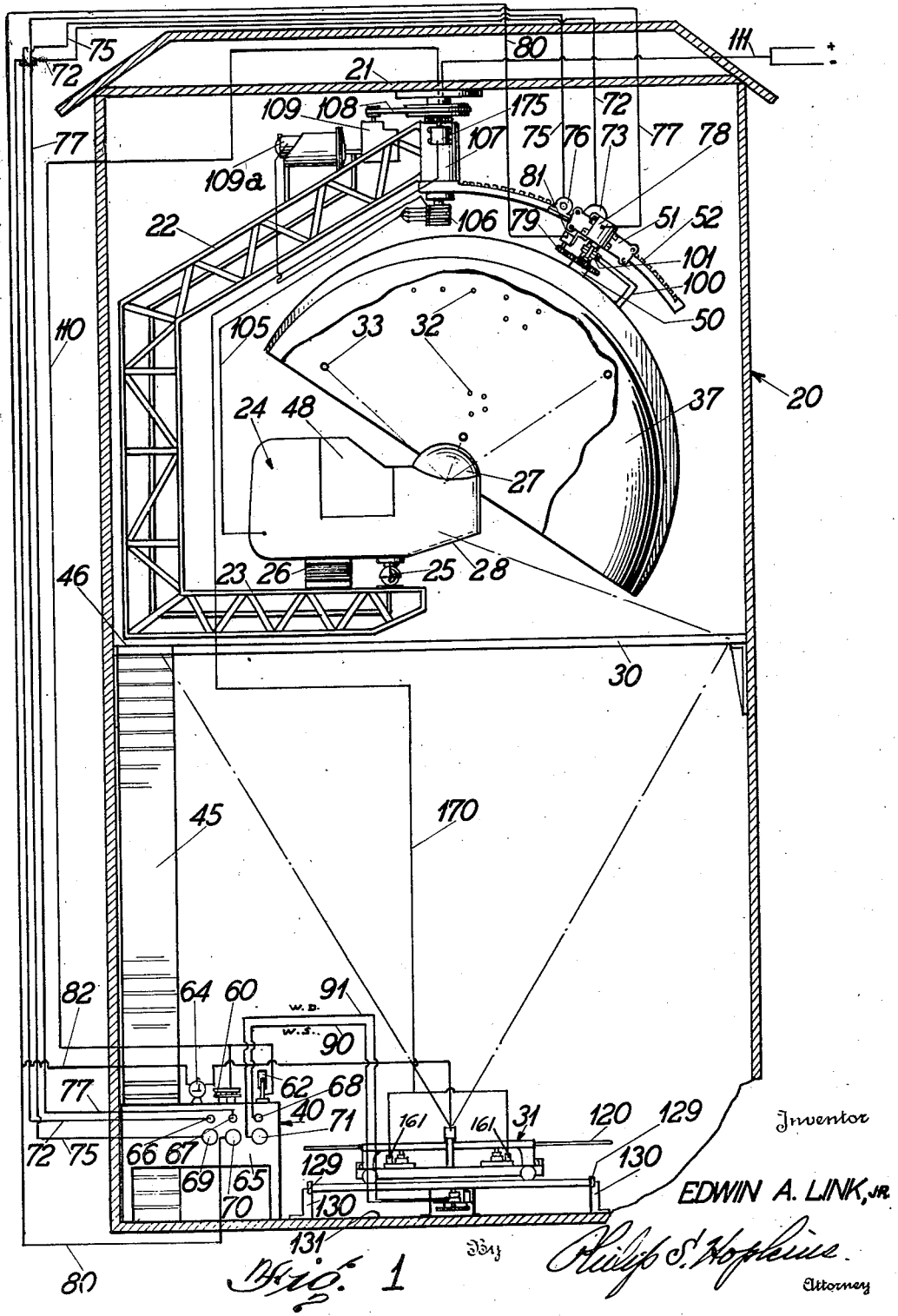

May 25, 1948.  E. A. LINK, JR  2,442,297
TRAINING DEVICE
Filed Jan. 14, 1939  4 Sheets-Sheet 1

Inventor
EDWIN A. LINK, JR.
Philip S. Hopkins
Attorney

May 25, 1948.   E. A. LINK, JR   2,442,297
TRAINING DEVICE
Filed Jan. 14, 1939   4 Sheets-Sheet 2

Inventor
EDWIN A. LINK, JR.
By Philip S. Hopkins
Attorneys

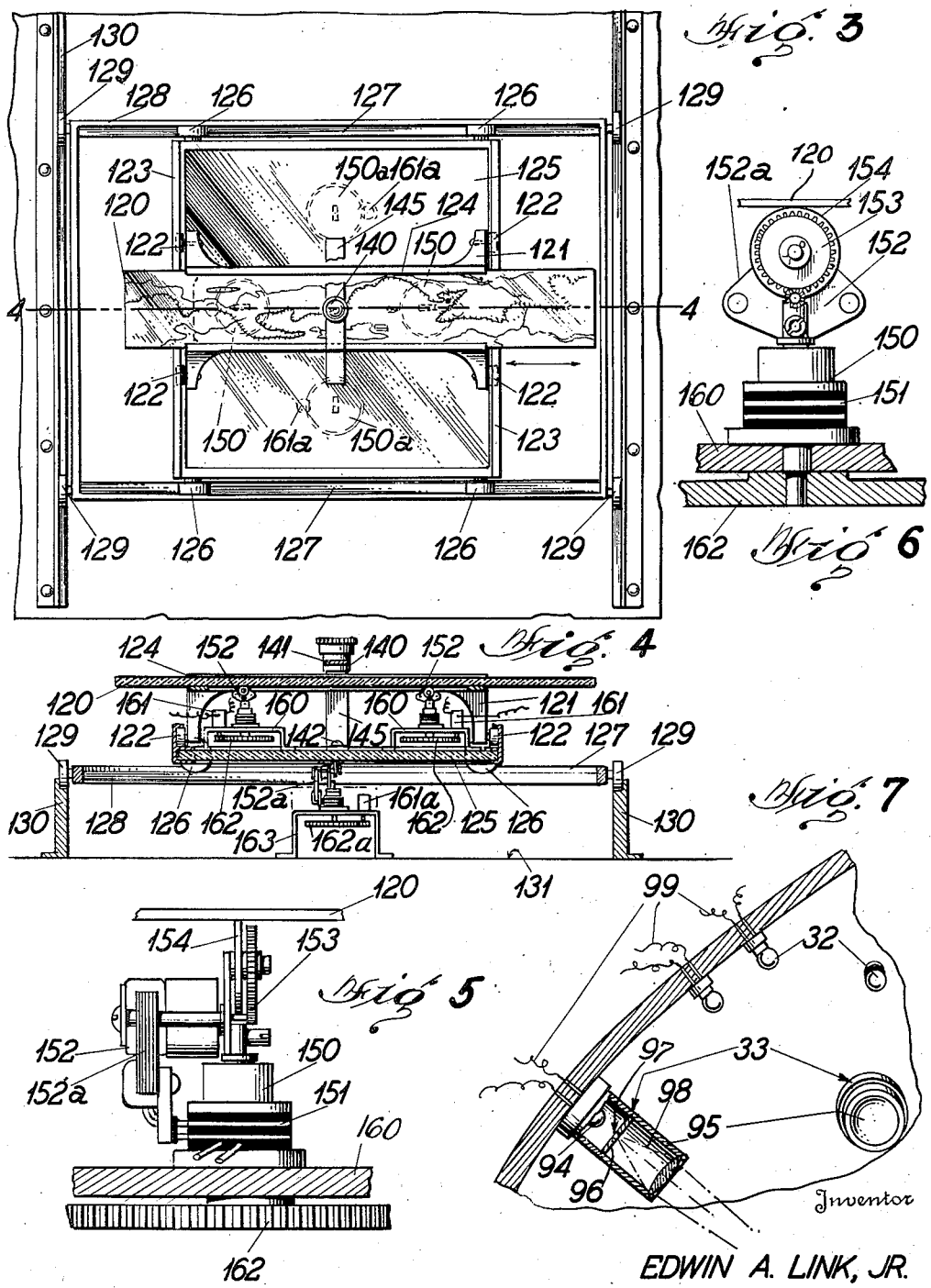

May 25, 1948.  E. A. LINK, JR  2,442,297
TRAINING DEVICE
Filed Jan. 14, 1939  4 Sheets-Sheet 4
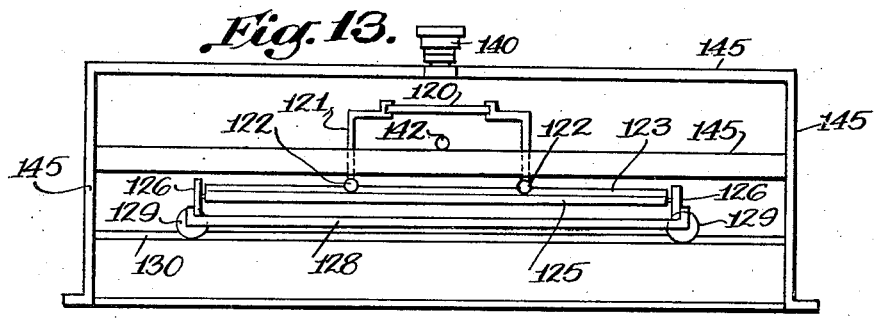
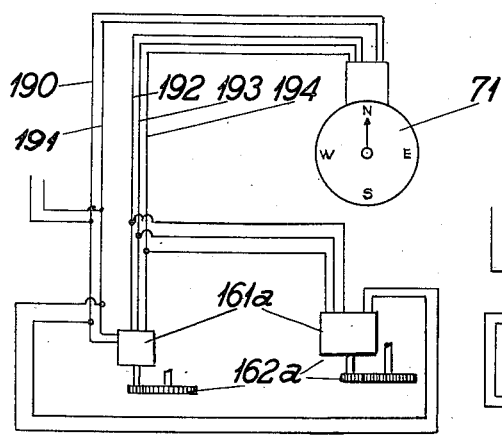
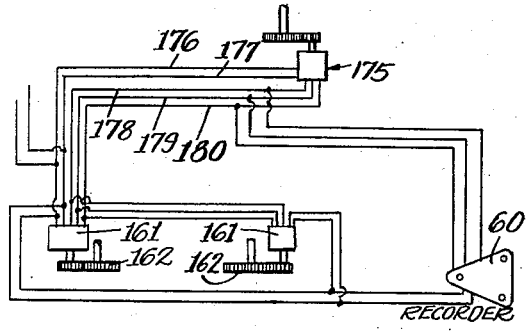
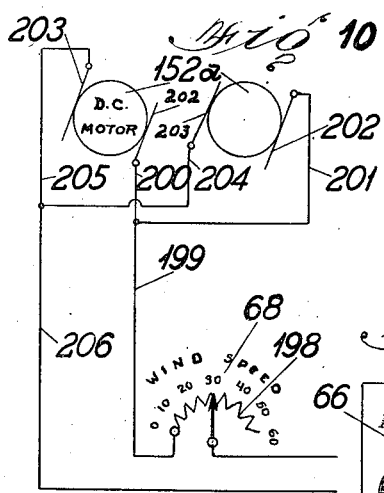
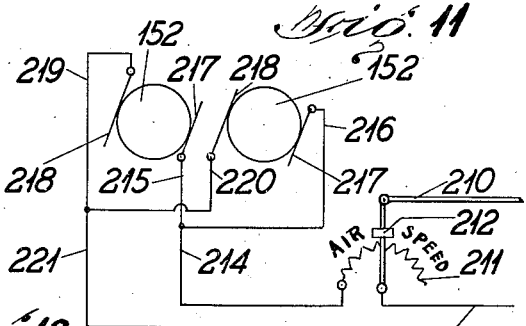
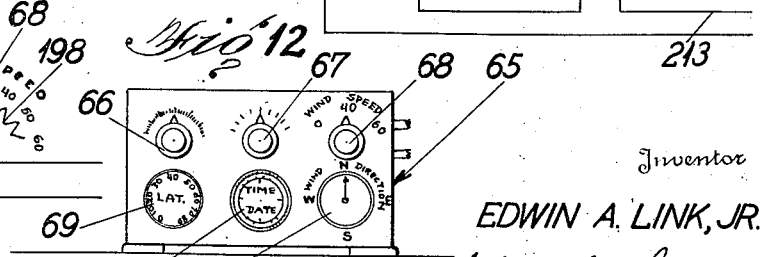
Inventor
EDWIN A. LINK, JR.
By Philip S. Hopkins
Attorney Patented May 25, 1948

2,442,297

UNITED STATES PATENT OFFICE 2,442,297

TRAINING DEVICE

Edwin A. Link, Jr., Binghamton, N. Y.

Application January 14, 1939, Serial No. 250,958

4 Claims. (Cl. 35—10)

This invention relates to training devices and more particularly to a training device for the instruction of aviators, and particularly pilots and navigators in the art of flying and navigation.

A primary object of this invention is the provision of a training device wherein many of the conditions incidental to actual aerial navigation are accurately simulated.

A still further object is the provision of a simulation of astronomical bodies in their proper relation to a training device whereby a pilot may compute a theoretical position without recourse to the natural astronomical bodies customarily necessary for the purpose.

A still further object is the simulation, in combination with a training device, adapted to be maneuvered in a manner similar to actual aircraft, of a device projecting a simulated terrain over which the plane is theoretically passing, on a screen, means being provided whereby variation in course and speed occasioned by wind drift may be simulated.

A still further object is the provision of a dome or planetarium or other structure simulating the sky visible at a particular latitude and longitude together with means whereby the light from various illuminated objects simulating navigational stars may be concentrated and directed on a given point whereby a sextant reading may be taken from that point.

A further object resides in the provision of means whereby such an astronomical dome may be rotated to simulate the actual movement of astronomical bodies as well as shifted longitudinally with respect to the training device to accommodate differences in latitude, as well as to compensate the distance flown at a given air speed.

A still further object resides in the provision of improved means for controlling the movement of the simulated terrain in accordance with direction and speed of flight from the training device per se.

A still further object resides in the provision of means whereby a pilot or other aviator may be trained in bombing in such manner that actual flying conditions, including the feel of movement of a plane, are accurately simulated.

Additional objects reside in the provision of air speed, wind drift, wind direction, latitude, time and date controlling means under the control of an instructor whereby the student may be given any desired navigational flight or reconnaissance problem in simulation of actual conditions.

Other objects reside in simplification, improvement and novelty of constructional details.

Other objects will in part be pointed out and shown in the accompanying drawing.

Figure 2:
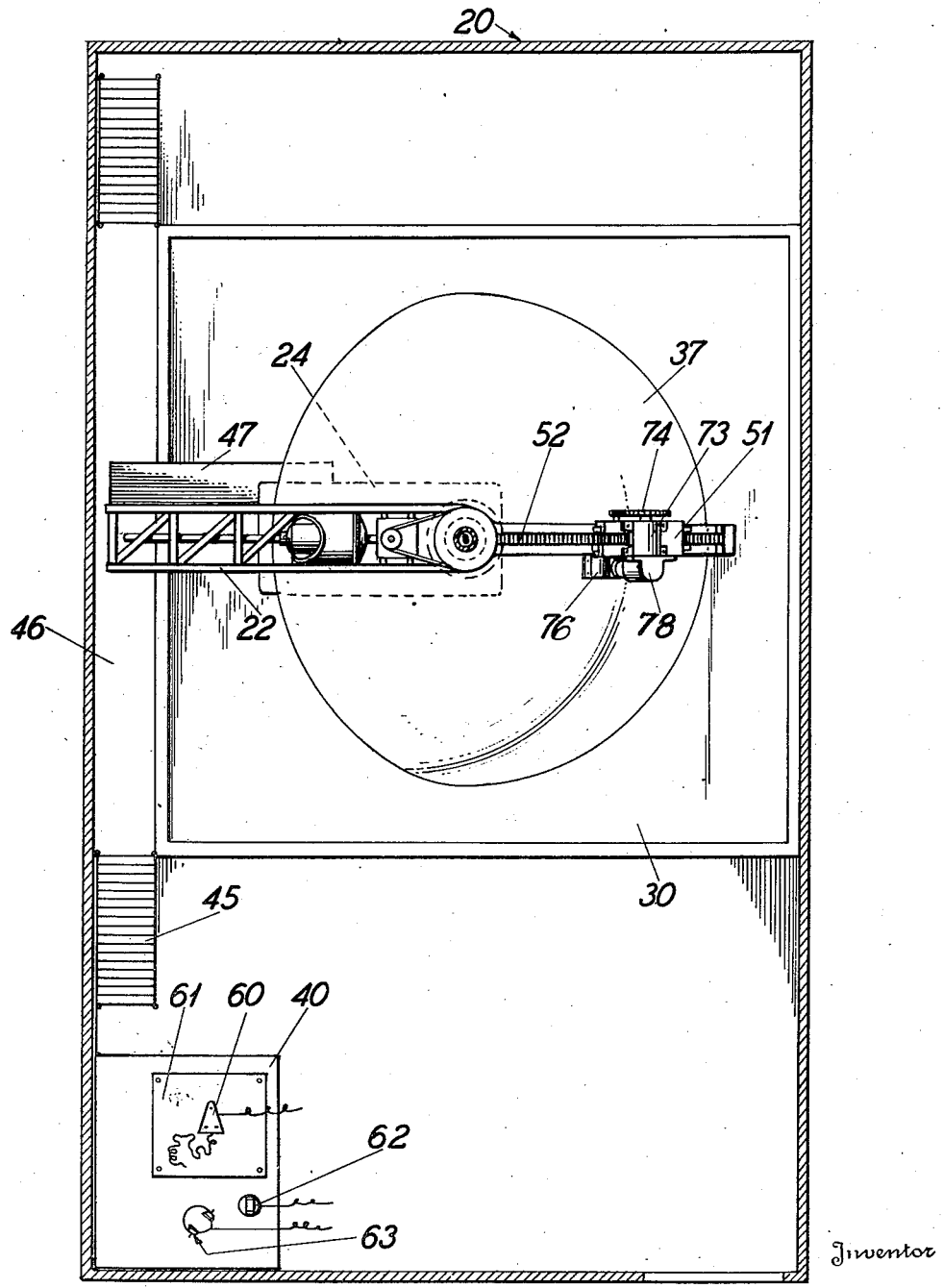

The invention accordingly consists in the combinations of elements, arrangements of parts and features of construction all as will be more fully pointed out hereinafter and disclosed in the accompanying drawing wherein:

Figure 1 is a side elevational view, partly in section disclosing the training device of the instant invention, the astronomical dome, the projecting means to simulate flight over terrain and the instructors control desk together with a fragmentary outline of a building containing such units, Figure 2 is a top elevational view partly in section of the assembly shown in Figure 1, Figure 3 is an enlarged detail view of the means simulating travel of the plane comprising the terrain projector, Figure 4 is a sectional view taken substantially along the line 4—4 of Figure 3, Figure 5 is an enlarged detail view of the means accomplishing movement of the ground indicating means, Figure 6 is a side elevational view of the device of Figure 5, Figure 7 is an enlarged detail view of the interior of the astronomical dome disclosing certain details of construction with relation to the projection of light therefrom, Figures 8, 9, 10 and 11 are wiring diagrams indicating the method of control and correlation of certain instruments all to be more fully pointed out hereinafter, and Figure 12 is a front elevational view of the control panel by which the instructor regulates certain factors simulating flight conditions.

Figure 13 is a side view of Figure 3.

Similar reference characters refer to similar parts throughout the several views of the drawing.

Having reference now to Figure 1 there is generally indicated at 20 a building containing and enclosing the apparatus of this invention and provided for the purpose of excluding external light in order to insure proper visibility of the artificial terrain and astronomical dome under simulated flying conditions. Within building 20 and supported in any suitable manner, preferably from the ceiling 21 thereof, is a framework 22 comprised of a U shaped member terminating in a supporting portion 23 upon which is mounted a training device generally indicated at 24. Training device 24 is mounted on a universal joint 25 and movable by bellows 26 to vary the angle thereof upwardly or downwardly to simulate dive and climb and bank in a known manner as more fully disclosed in applicant's Patent No. 1,825,462. The training device 24 in the preferred embodiment of the invention is comprised of a four passenger construction to accommodate a pilot, a co-pilot, a radio operator and a bomber or navigator which latter is seated under a transparent dome 27 for a purpose to be more fully pointed out hereinafter. A transparent plate 28 is positioned at the bottom of the navigator's cockpit in order that he may view the terrain as well as the simulated celestial conditions. Thus it will be seen that training device 24 may be tilted upwardly or downwardly as above mentioned and by movement of member 22, in a manner to be described hereinafter, may be rotated about the axis of the pivot or support of member 22 to simulate flight in any direction.

Positioned beneath the training device 24 is a transparent or translucent member 30 upon which is thrown an image from a projecting device generally indicated at 31, to be more fully described hereinafter. Positioned above transparent dome 27 is a large hemispherical dome or planetarium 37 provided interiorly with a plurality of lights 32 in simulation of such celestial objects as stars. A plurality of navigational stars are simulated by lights 33 of a different type, to be more fully described hereinafter. A control desk 40 is provided for the accommodation of an instructor and is provided with a plurality of controls and indicators as will be more fully pointed out hereinafter.

Ingress to training device 24 may be effected as by means of stairs 45 leading to a platform 46 along the side wall of building 20 and a second platform 47 mounted on member 22, training device 24 being provided with a door or doors 48.

Having particular reference now to dome 37 it will be seen that the same is supported by a pivot 50 which in turn is carried by a member 51 supported by a curved toothed rack 52. Member 51 carries a plurality of motors which will be pointed out individually and discussed hereinafter.

Having reference now to the instructor's control desk 40 there is positioned therein an indicator 60 of a type more fully described in applicant's United States Patent 2,179,663, which, through suitable connections records on a chart 61 the hypothetical course of the training device when no wind is present. A microphone 62 is provided and a head set 63 all connected for telephonic communication with the interior of the training device which is likewise provided with a microphone and head set (not shown.) Desk 40 also carries a master chronometer 64 and a control board generally indicated by the reference character 65. Control board 65 (see Figures 1 and 12) contains three instruments or control members, one of which control members 66 governs, in a manner to be described hereinafter, the position of member 51 and hence dome 37 on toothed rack 52, a second of which, 67, controls, in a manner likewise to be pointed out hereinafter, the rotation of astronomical dome 37 and the third of which 68 controls, also in a manner to be more fully pointed out, the simulation of wind speed. Likewise control panel 65 contains two indicators one of which, 69, indicates the relative position of the dome in angular relationship to the training device whereby to indicate the apparent latitude, as will be pointed out hereinafter, the other of which 70, indicates the position of rotation of the dome in order to designate the apparent time, date and longitude. A combined control member and indicator 71 may be moved to designate and control artificial wind direction in a manner to be more fully pointed out hereinafter.

Referring now to control member 66, a conduit 72 containing a wiring system leads therefrom to a motor 73 carried by supporting member 51 which motor when energized moves, through a system of gearing 74 (see Figure 2), member 51 and hence dome 37 along toothed rack 52 to govern the angular relation thereof with respect to the training device. Likewise a system of wiring contained in a cable 75 leads from indicator 69 to a transmitter 76 which through the transmission of electrical impulses, in a known manner, indicates on indicator 69 the angle of inclination of dome 37 and hence the ostensible latitude. A system of wiring contained in a conduit 77 leads from control member 67, to a motor 78, which controls through a system of gearing 79 the speed of rotation of dome 37. Likewise a conduit 80 leading from indicator 70 leads to a transmitter 81 which, in a manner similar to transmitter 76, indicates at all times on indicator 70 the position of rotation of dome 37 and hence designates the time of day, the date, and the longitude indicated by the position of the simulated stars within the dome. A conduit 82 leads from conduit 80 through chronometer 64 and in a known manner controls the speed at which the chronometer moves in accordance with the speed of rotation of the dome. Thus an artificial time may be created if desired since the speed of the dome may be varied to either the actual speed corresponding to the apparent rotation of the galactic universe or may be speeded up in such a manner that a problem in navigation which would normally require several hours may be accomplished within a relatively few minutes. A cable containing a system of wiring 90 leads from wind speed indicator 68 to a means for controlling wind speed as will be more fully pointed out hereinafter. Similarly a cable 91 leads from combined wind direction indicator and control 71 to a means for controlling the ostensible wind direction all to be more fully pointed out hereinafter.

In actual flying, the stars used for navigation are at so great a distance from the point of observation that a deviation in the position of a sextant a few feet or more has no measurable effect on the reading thereof with respect to the angular position of the star. However, simulated stars only a few feet from the observer necessitate the use of a confined beam projected approximately to a given area because the movement of a sextant only a few inches from a given area would cause a corresponding and material deviation of angle in the reading. Accordingly, the simulated navigational stars represented by bulbs 94 are each surrounded by a collimator 95 comprising a disk 96 having a small opening 97 centrally thereof through which light beams forming simulated stars 33 are projected to a spaced lens 98 which, in turn, directs the light beam in parallel rays to a point approximately beneath the axis of the dome when in a vertical position. In thus projecting a confined beam composed of parallel rays to an approximate location in the Trainer, a sextant may be employed in the usual manner to obtain navigational readings. As long as the sextant is moved about within the field of the parallel rays an accurate reading may be made. If the sextant is moved out of this field the simulated stars can not be seen by the observer thus obviating an inaccurate reading.

In the preferred embodiment of this invention the Northern Hemisphere is simulated by the planetarium and only those navigational stars used in navigation in the Northern Hemisphere are supplied with collimators. These navigational stars are Arcturus, Regulus, Capella, Pollux, Aldebaran, Caph, Alpheratz, Deneb, Vega, Altair, and Polaris.

However, if desired, it will be understood that navigational and non-navigational stars simulating those stars visible from the Southern Hemisphere may also be positioned in the dome and arrangements so made that either those stars visible from the Northern or Southern Hemispheres may be illuminated independently.

Wires 99 lead from all lights 32 and 33 to a suitable control cable and thence to wires 100 leading from the dome to suitable take-off rings 101 whereby current may be supplied to the lights from any desired source.

Referring back now to training device 24 mounted on member 22, suitable controls, as above mentioned, of a type disclosed in applicant's above mentioned Patent No. 1,825,462, are provided from which an electrical wiring system leads to a conduit 105 to a series of take-off rings 106 carried by a member 107 containing a pivot, which is energized for rotation through a belt drive 108 leading from an air motor 109 supplied with air by a turbine 109A whereby upon actuation of suitable controls to energize motor 109 the entire frame work 22 may be swung in a circle.

It should here be pointed out the wiring system for microphone 62 and receiving set 63 is carried through a cable 110 and thence to take-off rings 106 into the interior of the trainer. A cable 111 supplies electrical power to turbine 109A as well as to training device 24.

Having reference now to Figures 3 to 6 inclusive the projecting device 31, as shown in Figure 1, is disclosed in detail. This device consists of a lantern slide plate 120 upon which is imprinted in any desired manner a map or photographic mosaic simulating any desired locale. Plate 120 is carried in a frame 121 mounted on rollers 122 which travel in tracks 123 at right angles to the length of plate 120. Map plate 120 is also movable lengthwise in frame 121 due to its slidable relation with suitable grooves 124 carried by frame 121. Tracks 123 comprise portions of a frame 125 which in turn is mounted on rollers 126 which travel in tracks 127 in turn forming part of a frame member 128. Frame member 128 in turn is provided with rollers 129 which travel in fixed tracks 130 supported by the floor 131 of building 20.

Thus from the foregoing it will be seen that the simulated map 120 may move lengthwise through grooves 124 and sidewise on rollers 122 in grooves 123 and additionally have a second lengthwise movement through rollers 126 and grooves 127 and a second sidewise movement through rollers 129 and tracks 130. The purpose of this duplication of movement will be more fully pointed out hereinafter as will the method of achieving the same.

A projecting device 140 and a source of illumination 142, are carried by a support 145 and are positioned substantially centrally of map plate 120. This projecting device consists of magnifying lenses 141 positioned above map 120 and the source of illumination 142 is positioned below may 120. Supporting framework 145 is affixed to the floor 131. Thus when light 142 is illuminated, in any desired manner, an enlarged image of that particular section of the map or artificial terrain adjacent the projector lens is thrown upon translucent screen 30 in a known manner whereupon the same becomes visible from the training device 24.

Means are provided for moving plate 120 in any direction in accordance with the position of training device 24, such means taking the form best shown in Figures 5 and 6. Motor carriers 150 are provided with take-off rings 151 and motors 152 which motors through a system of gearing 153 rotate friction discs 154. Four of these motor carriers are provided, two of which are carried by frame 125 as by brackets 160 which brackets are provided with motors 161 connected to gears 162 whereby the entire device may be rotated for a purpose to be described hereinafter. Two of these motors are thus in direct contact with map plate 120. Two other similar units are provided with corresponding motors 161a acting upon gears 162a and carried by brackets 163 secured to the floor or base 131 of building 20. The friction wheels or members of these devices abut the lower surface of frame member 125. The relative position of these members is disclosed in dotted lines in Figure 3, the two positioned lengthwise of the strip being in abutting relation with map 120 and the two positioned at right angled relation to the strip being in abutting relation with frame member 125. All of these members are suitably connected in a known manner, as through a conduit 170 to a suitable transmitting motor 175 (see Figure 1) to which energization is supplied upon rotary movement of training device 24 imparted by the controls thereof thus varying simultaneously the position of each of these motor units. The particular control circuit will be discussed hereinafter. As illustrative, with the trainer in the position shown in the drawing motor units 150 abutting strip 120 will move the same in a direction towards the right hand side of the drawing. However, when the training device is turned through movement of frame member 22 to a right angled position with respect to the position shown in the drawing motor units 150 will turn simultaneously to move map plate 120 in a direction, as seen in Figure 3, either upwardly or downwardly to simulate flight at right angles to the previous course. Thus when flying lengthwise with respect to the map strip the same is moved in grooves 124 but when flying at right angles to this course the frame 121 is moved along grooves 123 in which rollers 122 ride. Thus any direction of flight may be simulated by the movement of the map strip in either of the above directions or any combinations of the two.

Having reference now to the second pair of motor units and their associated friction discs, these are for the purpose of determining wind direction and wind velocity and are controlled from controls 68 and 71 through conduits 90 and 91 in a manner to be more specifically pointed out hereinafter. However, it may be here noted that their position with respect to frame member 125 is determined by the position of the wind direction control and indicator and that in accordance with the position of this wind direction indicator these units move frame member 125 either lengthwise of map strip 120 as by rollers 126 in tracks 127 or at right angles to the length thereof as by rollers 129 and tracks 130. Thus it will be seen that the assumed course of travel of the trainer over the ground may be simulated in such manner as to compensate for wind direction. Control member 68 through controlling the speed of rotation of friction discs 154 in this last mentioned pair of motor units likewise controls the artificial wind velocity, as will be pointed out hereinafter.

Figure 8 comprises a wiring diagram showing the means of supplying power to motors 161 for the control of the direction of flight simulated by the training device. A motor of a known type, such as a motor 175 for transmitting electrical impulses is associated with trainer 24 and supplied with power through power lines 176 and 177 which simultaneously supply power to both of motors 161 as well as to recorder 60. The circuit is a three phase circuit of a known type and three control wires for phase splitting 178, 179, and 180 lead from motor 175 to both of motors 161 as well as to recorder 60. Thus it will be seen that any impulses transmitted to motor 175 from the controls of the trainer in order to govern the direction thereof are simultaneously and equally transmitted to both of motors 161 and recorder 60. In the above, the term both motors 161 refers only to those motors which regulate the rotation of motor carriers 150 whose rotating friction discs abut map plate 120.

Figure 9 discloses corresponding means of controlling wind direction, wind direction controls 71 being supplied with power through power lines 190 and 191 which likewise supply power to both of motors 161a. The reference letter "a" is here used to designate those motors which rotate the motor carriers where friction discs abut frame member 125 to distinguish the same from those motors abutting map strip 120. Correspondingly phase splitting lines 192, 193, and 194 lead from wind direction control 71 to both of motors 161a. Thus it will be seen that since control 71 comprises a transmitting motor any electrical impulse imparted thereto will be transmitted through a three phase circuit to motors 161a whereby the gears 162a may be varied or rotated to provide the required direction of movement of frame member 125 hence simulating the direction of wind.

In Figure 10 there is disclosed a schematic arrangement including controls 68 for varying the speed of motors 152a, the reference character "a" again designating those motors which act upon frame 125. Here it will be seen that wind speed control 68 acts upon a rheostat 198 positioned in a power line 199 feeding current to motors 152a through wires 200 and 201. Such current is supplied to one brush 202 of each of motors 152a, power returning from the motors through brushes 203 to wires 204 and 205 thence to cold line 206. Thus it will be seen that the positioning of the pointers of wind speed control 68 controls, through rheostat 198, the amount of current admitted to motors 152a and hence the speed at which they rotate to vary the simulated wind speed as desired.

Figure 11 shows a similar arrangement for controlling the speed of motors 152. A control bar 210 connected to a throttle in training device 24, all as disclosed in Patent No. 1,825,462, engages a rheostat 211, an insulator 212 permitting the current to pass from a lead 213 through rheostat 211 and thence through a wire 214 and wires 215 and 216 to brushes 217 and thence through motors 152 to brushes 218, through wires 219 and 220 to cold line 221. Thus it will be seen that air speed as simulated by the speed of those motors 152 acting upon plate 120 may be varied under the control of the pilot in the training device.

Now from the foregoing it will be seen that there is herein provided a training device for the use of student aviators which accomplishes all the objects of this invention and others including many advantages of great practical utility. Such objects as above pointed out reside in the provision of a training device which simulates many of the conditions found in actual flying including the observation of stellar bodies, means permitting the observation of terrain over which the plane is flying, means for controlling the direction of flight, the altitude and the rate of dive and climb as well as means simulating such natural conditions as wind speed and wind direction. Likewise problems involving different latitude, longitude, time of day, and date may be arranged under the control of an instructor. Again the speed of apparent galactic rotation or time may be controlled by the instructor to permit the achievement of a relatively long flying problem in a relative short time.

As many embodiments may be made of the inventive concept and as many modifications may be made of the embodiments hereinbefore set forth and shown in the accompanying drawing it is to be understood that all matters hereinbefore set forth and shown is to be interpreted merely as illustrative and not in a limiting sense.

I claim:

1. In a device for teaching the art of navigation, the combination of a grounded support for a student, said support being mounted for rotation about a vertical axis, a course simulating member comprising a representation of a portion of the earth's surface arranged for movement to simulate the movement over the earth's surface of the support, a screen visible from said support, means for projecting the representation upon said course simulating member to said screen, and means operated by the rotation of said support about the vertical axis for changing the direction of movement of said course simulating member relative to said projecting means.

2. In a device for teaching the art of navigation, the combination of a grounded support for a student, said support being mounted for rotation about a vertical axis, a course simulating member comprising a representation of a portion of the earth's surface arranged for movement to simulate the movement over the earth's surface of the support, a screen visible from said support, means for projecting the repreesntation upon said course simulating member to said screen, means associated with said support for varying the rate of travel of said course simulating member relative to said projecting means, and means operated by the rotation of said support about the vertical axis for changing the direction of movement of said course simulating member relative to said projecting means.

3. In a device for teaching the art of navigation, the combination of a grounded support for a student, said support being mounted for rotation about a vertical axis, a projection screen below said support and visible therefrom, means for projecting a representation of a part of the earth's surface upon said screen, said projecting means being coincident with the axis of rotation of said support.

4. In a device for teaching the art of navigation, the combination of a grounded support for a student, said support being mounted for rotation about a vertical axis, a propelling device remote from said support for driving a course simulating member, said propelling device comprising a wheel driven by a variable speed motor and an auto-synchronous motor for changing the direction of said wheel, an auto-synchronous motor associated with said support and controlled by the rotation of said support connected to said first mentioned auto-synchronous motor to change the direction of said wheel upon a rotation of said support, and a movable member associated with said support for controlling the speed of said variable speed motor.

EDWIN A. LINK, JR.

REFERENCES CITED

The following references are of record in the file of this patent:

UNITED STATES PATENTS

| Number | Name | Date |
|---|---|---|
| 830,718 | Holt | Sept. 11, 1906 |
| 1,019,405 | Atwood | Mar. 5, 1912 |
| 1,109,665 | Cummings | Sept. 8, 1914 |
| 1,293,747 | Ford | Feb. 11, 1919 |
| 1,393,456 | Ruggles | Oct. 11, 1921 |
| 1,402,498 | Horn | Jan. 3, 1922 |
| 1,596,936 | Mengden | Aug. 24, 1926 |
| 1,701,582 | Mengden | Feb. 12, 1929 |
| 1,770,820 | Tomasevich | July 15, 1930 |
| 1,799,895 | Graham et al. | Apr. 7, 1931 |
| 1,831,939 | White | Nov. 17, 1931 |
| 1,938,595 | Karnes et al. | Dec. 12, 1933 |
| 1,985,265 | Smith et al. | Dec. 25, 1934 |
| 1,985,266 | Smith et al. | Dec. 25, 1934 |
| 2,034,298 | Holman | Mar. 17, 1936 |
| 2,091,154 | Matzner | Aug. 24, 1937 |
| 2,099,857 | Link | Nov. 23, 1937 |
| 2,119,083 | Link | May 31, 1938 |
| 2,163,746 | Courtois-Suffit et al. | June 27, 1939 |
| 2,164,412 | Koster | July 4, 1939 |
| 2,179,663 | Link | Nov. 14, 1939 |
| 2,364,539 | Link | Dec. 5, 1944 |

FOREIGN PATENTS

| Number | Country | Date |
|---|---|---|
| 218,891 | Germany | 1910 |
| 384,971 | Great Britain | 1931 |
| 747,274 | France | 1933 |

OTHER REFERENCES

Air Corps News Letter, vol. 21, No. 6, dated Mar. 15, 1938, pages 7 and 8.